(12) United States Patent
Katayama et al.

(10) Patent No.: US 7,904,076 B2
(45) Date of Patent: Mar. 8, 2011

(54) PERSONAL CONFIGURATION INFORMATION SHARING SYSTEM

(75) Inventors: Takahiro Katayama, Daito (JP); Toshihiro Takagi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 653 days.

(21) Appl. No.: 11/734,417

(22) Filed: Apr. 12, 2007

(65) Prior Publication Data

US 2007/0242164 A1 Oct. 18, 2007

(30) Foreign Application Priority Data

Apr. 13, 2006 (JP) ................................. 2006-111014

(51) Int. Cl.
*H04M 3/00* (2006.01)
(52) U.S. Cl. ...................................... 455/420; 455/414.1
(58) Field of Classification Search ................ 455/414.1, 455/418–420
See application file for complete search history.

(56) References Cited

U.S. PATENT DOCUMENTS

| 6,178,443 B1 * | 1/2001 | Lin ............................... 709/208 |
| 2004/0029525 A1 * | 2/2004 | Vertelney ..................... 455/3.03 |
| 2005/0018766 A1 * | 1/2005 | Iwamura ................... 375/240.01 |
| 2006/0177028 A1 * | 8/2006 | Vermola ..................... 379/93.28 |
| 2006/0218867 A1 | 10/2006 | Koshiyama et al. |
| 2006/0257123 A1 * | 11/2006 | Horozov et al. .............. 386/112 |

FOREIGN PATENT DOCUMENTS

| JP | 2000-194630 A | 7/2000 |
| JP | 2005-99949 A | 4/2005 |
| JP | 2005-209145 A | 8/2005 |
| JP | 2005-234963 A | 9/2005 |

* cited by examiner

*Primary Examiner* — Lester Kincaid
*Assistant Examiner* — Steven Lim
(74) *Attorney, Agent, or Firm* — Crowell & Moring LLP (57) ABSTRACT

Disclosed is a personal configuration information sharing system comprising a plurality of pieces of electric equipment connected with one another through a network, the plurality of pieces of electric equipment sharing personal configuration information with each other, wherein a setting time of set contents in a first personal configuration information of a first electronic equipment received by a first personal configuration information reception unit is compared with a setting time of set contents in a second personal configuration information of a second electronic equipment extracted by an extraction unit, and the first personal configuration information and the second personal configuration information are merged to update the second personal configuration information to the set contents which are set later.

3 Claims, 6 Drawing Sheets

| PORTABLE TELEPHONE NUMBER | FIRST PERSONAL CONFIGURATION INFORMATION | | |
|---|---|---|---|
| | SET CONTENTS | | SETTING TIME |
| 090-**-2 | CH.4 OF GROUND WAVE BROADCAST | DELETION OF FAVORITE CHANNEL | 2006/04/01/12:50 |
| | CH.5 OF GROUND WAVE BROADCAST | REGISTRATION OF FAVORITE CHANNEL | 2006/04/01/13:00 |
| ... | ... | ... | ... |

FIG.4

| PORTABLE TELEPHONE NUMBER | SECOND PERSONAL CONFIGURATION INFORMATION | | |
|---|---|---|---|
| | SET CONTENTS | | SETTING TIME |
| 090-**-*1 | CH. 3 OF SATELLITE BROADCAST | REGISTRATION OF FAVORITE CHANNEL | 2006/04/01/11:00 |
| 090-**-*2 | CH. 4 OF GROUND WAVE BROADCAST | REGISTRATION OF FAVORITE CHANNEL | 2006/04/01/12:30 |
| 090-**-*3 | ... | ... | ... |
| ... | ... | ... | ... |

FIG.5

| PORTABLE TELEPHONE NUMBER | SECOND PERSONAL CONFIGURATION INFORMATION | | |
|---|---|---|---|
| | ... | SET CONTENTS | SETTING TIME |
| 090-**-*1 | CH.3 OF SATELLITE BROADCAST | ... | ... |
| | | REGISTRATION OF FAVORITE CHANNEL | 2006/04/01/11:00 |
| 090-**-*2 | CH. 4 OF GROUND WAVE BROADCAST | DELETION OF FAVORITE CHANNEL | 2006/04/01/12:50 |
| | CH. 5 OF GROUND WAVE BROADCAST | REGISTRATION OF FAVORITE CHANNEL | 2006/04/01/13:00 |
| 090-**-*3 | ... | ... | ... |
| ... | | ... | ... |

FIG.6

PERSONAL CONFIGURATION INFORMATION SHARING SYSTEM

BACKGROUND OF THE INVENTION

1. Field of the Invention

The present invention relates to a personal configuration information sharing system.

2. Description of Related Art

When the setting, the change, the deletion and the like (hereinafter referred to as "setting and the like") of the same configuration information are performed to a plurality of pieces of electric equipment, management apparatus capable of performing the setting and the like simultaneously to the plurality of pieces of electric equipment through, for example, a network were proposed in the past (see, for example, Japanese patent application publication laid-open No. 2005-099949 and Japanese patent application publication laid-open No. 2000-194630).

Moreover, as for the networks and the management apparatus, a management apparatus capable of keeping a normal communication state always by monitoring the information pertaining to the operational management of a network periodically was proposed (see, for example, Japanese patent application publication laid-open No. 2005-234963), and a management apparatus capable of controlling pieces of electric equipment in a plurality of networks by managing the networks in a composite network environment in which the networks can perform bidirectional communications with one another was also proposed (see, for example, Japanese patent application publication laid-open No. 2005-209145).

Now, for example, when one piece of electric equipment among a plurality of pieces of electric equipment is portable electric equipment (for example, a portable telephone or the like) and the other pieces of electric equipment is stationary electric equipment (for example, a television broadcast receiver or the like) and the portable electric equipment and the stationary electric equipment have the same function (for example, a television broadcast reception function or the like), it is supposed that the owner of the portable electric equipment and the stationary electric equipment, for example, set a piece of configuration information a in the stationary electric equipment when at home and the owner went out after that to change the configuration information a set in the portable electric equipment to configuration information b. In this case, it can be said that the configuration information b set most recently is the configuration information desired by the owner. However, if the owner wants to set the configuration information b set in the portable electric equipment into the stationary electric equipment, the owner need to set the configuration information b into the stationary electric equipment again. Thus, there is the problem of troublesomeness in this case.

Because each of the management apparatus disclosed in Japanese patent application publication laid-open No. 2005-099949 and Japanese patent application publication laid-open No. 2000-194630 simultaneously sets configuration information in the plurality of pieces of electric equipment, it is impossible to set the configuration information into, for example, a piece of electric equipment that was not connected to the network at the time of setting the configuration information. Accordingly, it is needed to set the configuration information again into the electric equipment that was not connected to the network. Moreover, Japanese patent application publication laid-open No. 2005-234963 and Japanese patent application publication laid-open No. 2005-209145 do not disclose anything about the sharing of configuration information at all, and the patent publications do not contribute to the settlement of the problem mentioned above at all.

SUMMARY OF THE INVENTION

It is an object of the present invention to simplify the setting of the latest personal configuration information in a personal configuration information sharing system sharing personal configuration information among a plurality of pieces of electric equipment connected with one another through a network.

According to a first aspect of the invention, a personal configuration information sharing system comprising a portable telephone having a television broadcast reception function, and a television broadcast receiver connected to the portable telephone through a network, the portable telephone and the television broadcast receiver sharing personal configuration information with each other, wherein the portable telephone includes: a first storage unit to store personal identification information for identifying an individual, and first personal configuration information including set contents related to setting of a channel and a setting time when the set contents have been set; a transmission request reception unit to receive a transmission request of the first personal configuration information from the television broadcast receiver; and a first personal configuration information transmission unit to transmit the personal identification information and the first personal configuration information, both of which are stored in the first storage unit, to the television broadcast receiver when the reception unit receives the transmission request of the first personal configuration information, and wherein the television broadcast receiver includes: a second storage unit to store second personal configuration information including set contents and a setting time when the set contents have been set associated with each personal identification information for identifying an individual; a request unit to request the portable telephone to transmit the first personal configuration information when a power source of the television broadcast receiver is turned on; a first personal configuration information reception unit to receive the personal identification information and the first personal configuration information, both of which is transmitted from the first personal configuration information transmission unit; an extraction unit to extract the second personal configuration information corresponding to the personal identification information received by the first personal configuration information reception unit from the second storage unit; and an update unit to compare the setting time of the set contents in the first personal configuration information received by the first personal configuration information reception unit with the setting time of the set contents in the second personal configuration information extracted by the extraction unit, and to merge the first personal configuration information received by the first personal configuration information reception unit and the second personal configuration information extracted by the extraction unit to update the second personal configuration information to the set contents which are set later.

By doing so, the update unit can compare the setting time of the set contents in the first personal configuration information received by the first personal configuration information reception unit with the setting time of the set contents in the second personal configuration information extracted by the extraction unit, and merge the first personal configuration information received by the first personal configuration information reception unit and the second personal configuration information extracted by the extraction unit to update the second personal configuration information so as to have the set contents set later.

That is, because the television broadcast receiver can set the latest personal configuration information based on the first personal configuration information transmitted from the portable telephone and the second personal configuration information set in the television broadcast receiver, the setting of the latest personal configuration information can be simplified.

Moreover, when the power source of the television broadcast receiver is turned on, the transmission of the first personal configuration information to the portable telephone can be requested by the request unit.

That is, when the power source of the television broadcast receiver is turned on, the latest personal configuration information is automatically set in the television broadcast receiver. Consequently, the setting of the latest personal configuration information can be more simplified.

Moreover, for example, when the power source of the television broadcast receiver is unexpectedly turned off and thereafter the power source recovers to turn on the power source of the television broadcast, the latest personal configuration information is automatically set in the television broadcast receiver. Consequently, the personal configuration information sharing system has high convenience.

Moreover, because the set contents included in the first personal configuration information and the second personal configuration information include the contents related to the setting of the channel, the portable telephone and the television broadcast receiver can share the contents related to the setting of the channel. Consequently, the personal configuration information sharing system has good usability.

According to a second aspect of the invention, a personal configuration information sharing system comprising a plurality of pieces of electric equipment connected with one another through a network, the plurality of pieces of electric equipment sharing personal configuration information with each other, wherein first electric equipment includes: a first storage unit storing first personal configuration information including set contents and a setting time when the set contents have been set associated with each personal identification information for identifying an individual; a transmission request reception unit to receive a transmission request of the first personal configuration information from second electric equipment; and a first personal configuration information transmission unit to transmit the personal identification information and the first personal configuration information, both of which are stored in the first storage unit, to the second electric equipment when the reception unit receives the transmission request of the first personal configuration information, and wherein the second electric equipment includes: a second storage unit to store second personal configuration information including set contents and a setting time when the set contents have been set associated with each personal identification information for identifying an individual; a request unit to request the first electric equipment to transmit the first personal configuration information; a first personal configuration information reception unit to receive the personal identification information and the first personal configuration information, both of which is transmitted from the first personal configuration information transmission unit; an extraction unit to extract the second personal configuration information corresponding to the personal identification information received by the first personal configuration information reception unit from the second storage unit; and an update unit to compare the setting time of the set contents in the first personal configuration information received by the first personal configuration information reception unit with the setting time of the set contents in the second personal configuration information extracted by the extraction unit, and to merge the first personal configuration information received by the first personal configuration information reception unit and the second personal configuration information extracted by the extraction unit to update the second personal configuration information to the set contents which are set later.

By doing so, the update unit can compare the setting time of the set contents in the first personal configuration information received by the first personal configuration information reception unit with the setting time of the set contents in the second personal configuration information extracted by the extraction unit, and merge the first personal configuration information received by the first personal configuration information reception unit and the second personal configuration information extracted by the extraction unit to update the second personal configuration information so as to have the set contents set later.

That is, because the second electric equipment can set the latest personal configuration information based on the first personal configuration information transmitted from the first electric equipment and the second personal configuration information set in the second electric equipment, the setting of the latest personal configuration information can be simplified.

Preferably, the request unit of the second aspect requests the first electric equipment to transmit the first personal configuration information when a power source of the second electric equipment is turned on.

Thereby, when the power source of the second electric equipment is turned on, the request unit can request the first electric equipment to transmit the first personal configuration information.

That is, when the power source of the second electric equipment is turned on, the latest personal configuration information is automatically set in the second electric equipment. Consequently, the latest personal configuration information can be set more simply.

Moreover, for example, when the power source of the second electric equipment is unexpectedly turned off and thereafter the power source recovers to turn on the power source of the second electric equipment, the latest personal configuration information is automatically set in the second electric equipment. Consequently, the personal configuration information sharing system has high convenience.

Preferably, the first electric equipment and the second electric equipment of the second aspect severally have a television broadcast reception function, and the set contents included in the first personal configuration information and the second personal configuration information include contents related to setting of a channel.

Thereby, because the first electric equipment and the second electric equipment has the television broadcast reception function and the set contents included in the first personal configuration information and the second personal configuration information include the contents related to the setting of the channel, the plurality of pieces of electric equipment can share the contents related to the setting of the channel. Consequently, the personal configuration information sharing system has good usability.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

DETAILED DESCRIPTION OF THE PREFERRED EMBODIMENTS

In the following, the best mode of the personal configuration information sharing system according to the present invention will be described in detail with reference to the attached drawings. Incidentally, the scope of the present invention is not limited to the shown examples.

In the present embodiment, descriptions are given on the supposition that a portable telephone is exemplified as first electric equipment, and that a television broadcast (hereinafter referred to as "TV broadcast") receiver is exemplified as second electric equipment.

<Configuration of Personal Configuration Information Sharing System>

Figure 1:
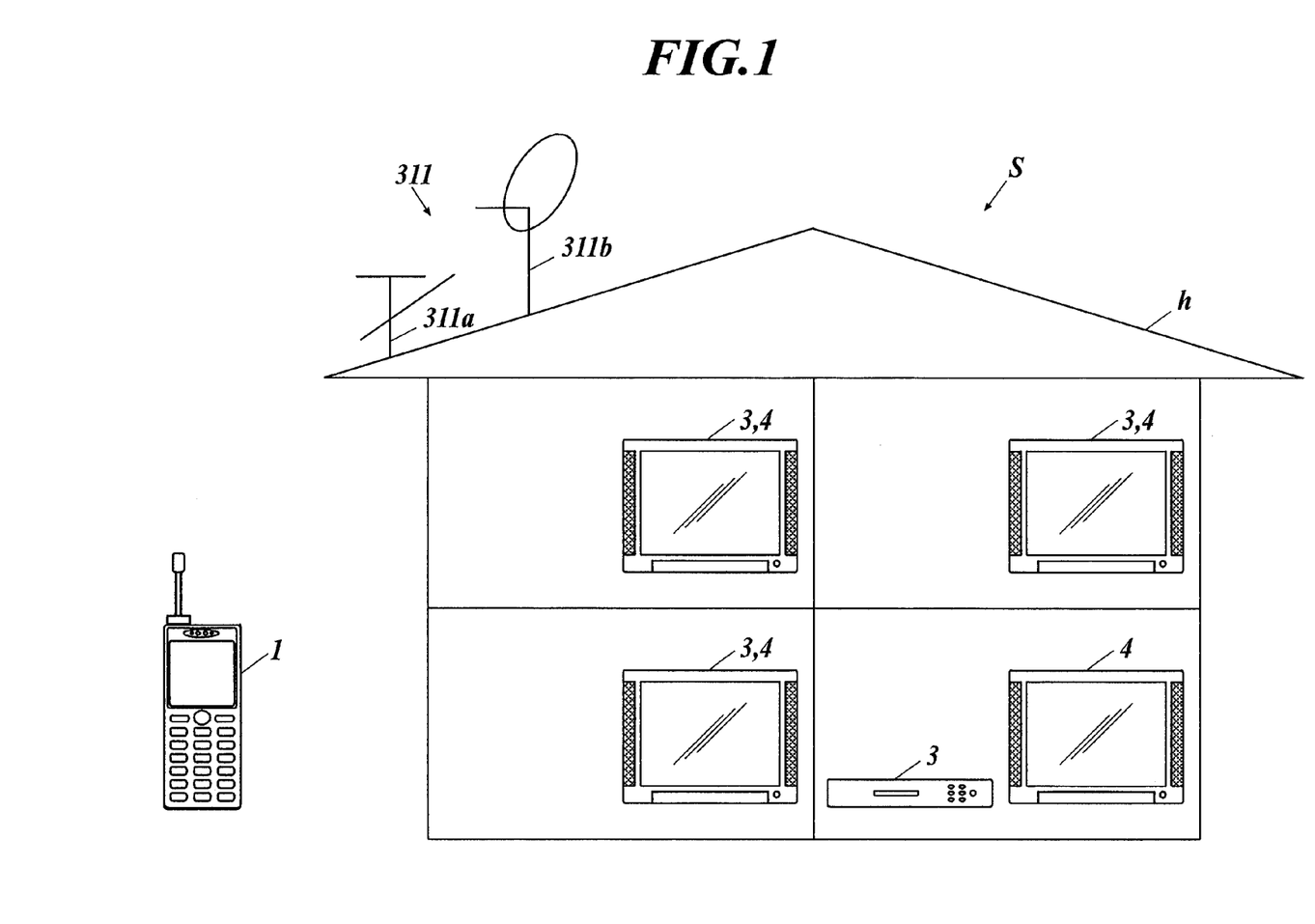
FIG. 1 is the view showing the whole configuration of a personal configuration information sharing system according to the present invention.

First, the configuration of a personal configuration information sharing system S is described with reference to FIGS. 1 and 2.

The personal configuration information sharing system S includes, for example, a portable telephone 1 having a TV broadcast reception function and TV broadcast receivers 3 connected to the portable telephone 1 through a network N, and the portable telephone 1 and the TV broadcast receivers 3 share personal configuration information.

The portable telephone 1 is, for example, the portable telephone owned by the inhabitant (user) of a house h.

The TV broadcast receivers 3 are installed in the house h, for example, integrally with output apparatus 4 or as separated bodies from the output apparatus 4.

The network N is, for example, a network such as a wireless local area network (LAN) in accordance with the Bluetooth standard or the Institute of Electrical and Electronic Engineers (IEEE) 802.11 standard.

Incidentally, the network N may be a wired network.
(Configuration of Portable Telephone)

Figure 2:
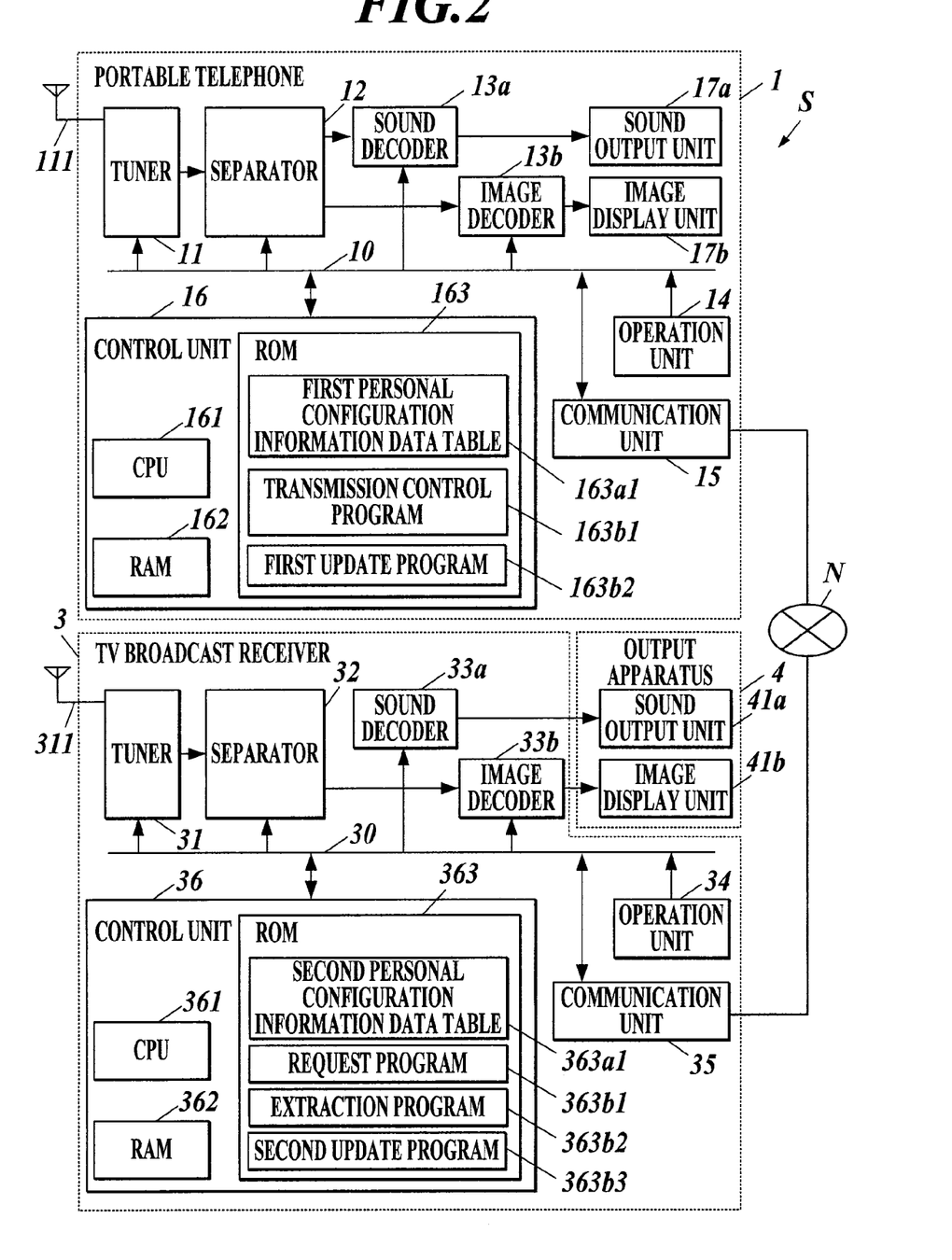
FIG. 2 is a diagram showing the functional configuration of the personal configuration information sharing system according to the present invention.

The portable telephone 1 is configured to include, for example, a tuner 11 having an antenna 111, a separator 12, a sound decoder 13a, an image decoder 13b, an operation unit 14, a communication unit 15, a control unit 16 and the like, as shown in FIG. 2. Each unit is connected with one another with a bus 10.

Moreover, the portable telephone 1 is also provided with, for example, a sound output unit 17a connected to the sound decoder 13a, an image display unit 17b connected to the image decoder 13b, and the like.

The tuner 11 having the antenna 111 receives a TV broadcast signal existing in the frequency band corresponding to the channel of a broadcast program desired by the user among the TV broadcast signals received by the antenna 111 in accordance with, for example, a control signal input from the control unit 16. Then, the tuner 11 modulates the TV broadcast signal into an intermediate frequency signal (IF signal), and outputs the IF signal to the separator 12.

Here, the antenna 111 is, for example, an antenna for ground wave broadcasts.

The separator 12 performs the following processing in accordance with, for example, the control signals input from the control unit 16. That is, the separator 12 performs the processing of digital demodulation, error correction and the like to the IF signal output from the tuner 11 having the antenna 111, decodes a stream (for example, a transport stream), discriminates each transport packet constituting the transport stream, and separates the data pertaining to the transport packets related to the broadcast program desired by the user into compressed sound data, compressed image data and the like. Then, the separator 12 outputs the compressed sound data to the sound decoder 13a, and outputs the compressed image data to the image decoder 13b.

The sound decoder 13a decodes the compressed sound data output from the separator 12 in accordance with, for example, a control signal input from the control unit 16, and outputs sound data to the sound output unit 17a.

The sound output unit 17a is provided with, for example, a not shown speaker and the like, and performs the output of sounds based on the sound data output from the sound decoder 13a.

The image decoder 13b decodes the compressed image data output from the separator 12 in accordance with, for example, a control signal input from the control unit 16, and outputs image data to the image display unit 17b.

The image display unit 17b is provided with, for example, a not shown liquid crystal type display screen or the like, and performs the output of an image based on the image data output from the image decoder 13b.

The operation unit 14 is composed of, for example, operation buttons (not shown) provided on the outer surface of the portable telephone 1, and the like. The operation unit 14 is operated by, for example, the user, and outputs various signals accompanying the operation to the control unit 16.

To put it concretely, the operation unit 14 is used, for example, when the user specifies set contents (described below) or the like.

The communication unit 15 is provided with, for example, an antenna (not shown) for performing the transmission and the reception of radio signals with each of the TV broadcast receivers 3, a radio frequency (RF) converter (not shown), a wireless LAN card (not shown) for connecting the communication unit 15 with a wireless LAN in accordance with the Bluetooth standard and the IEEE 802.11 standard, and the like. The communication unit 15 performs the transmission and the reception of various kinds of information with each of the TV broadcast receivers 3 through the network N.

To put it concretely, the communication unit 15 receives, for example, the transmission request of first personal configuration information (described below) from each of the TV broadcast receivers 3, as a transmission request reception unit.

The control unit 16 is provided with, for example, a central processing unit (CPU) 161, a random access memory (RAM) 162, a read only memory (ROM) 163 and the like.

The CPU 161 performs various control operations in accordance with various processing programs for the portable telephone 1 stored in the ROM 163.

The RAM 162 is provided with a program storage area for expanding a processing program executed by the CPU 161, a data storage area for storing input data and processing results produced at the time of the execution of the processing program, and the like.

The ROM 163 stores a system program executable in the portable telephone 1, various processing programs executable on the system program, data to be used at the time of the execution of the various processing programs, the data of the processing results of the operation processing of the CPU 161, and the like. Incidentally, the programs are stored in the ROM 163 in the form of the program codes capable of being read by a computer.

To put it concretely, the ROM 163 stores, for example, a first personal configuration information data table 163a1, a transmission control program 163b1, a first update program 163b2, and the like.

The first personal configuration information data table 163a1 stores as a first storage unit, for example, a portable telephone number as personal identification information for identifying an individual, and first personal configuration information including set contents and the setting times when the set contents were set.

Figure 3:
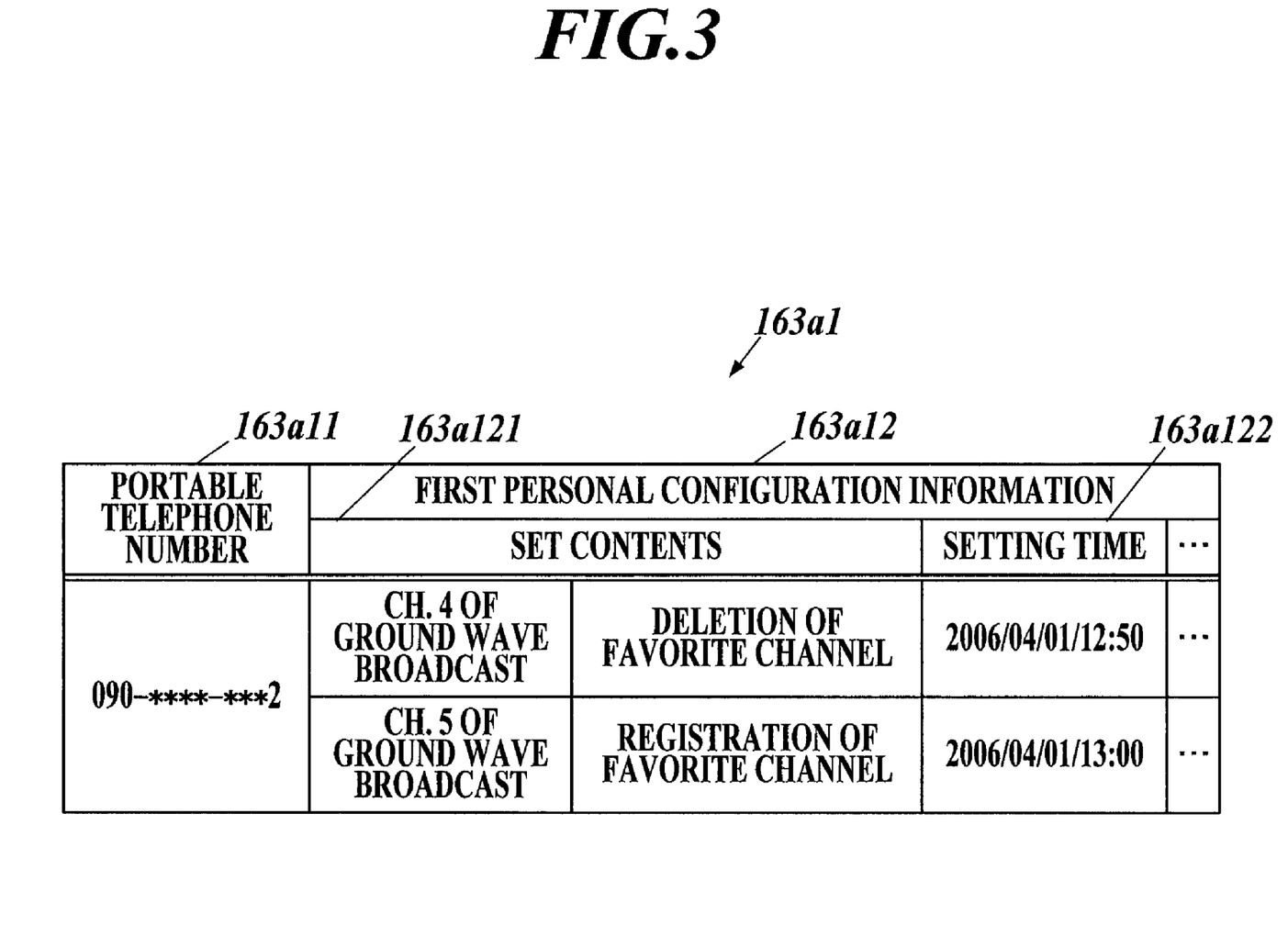
FIG. 3 is a view showing the data structure of the first personal configuration information data table shown in FIG. 2.

To put it concretely, the first personal configuration information data table 163a1 includes, for example, a "portable telephone number" storage area 163a11, a "first personal configuration information" storage area 163a12 and the like, as shown in FIG. 3.

The "portable telephone number" storage area 163a11 stores, for example, the portable telephone number of the portable telephone 1.

The "first personal configuration information" storage area 163a12 includes, for example, a "set contents" storage area 163a121, a "setting time" storage area 163a122 and the like, as shown in FIG. 3.

The "set contents" storage area 163a121 stores, for example, the set contents related to the setting of channels such as the registration of a favorite channel, the deletion of a favorite channel, and the like to each channel.

The "setting time" storage area 163a122 stores, for example, the setting times when corresponding set contents were set.

To put it concretely, the first personal configuration information data table 163a1 shown in FIG. 3 stores, for example, the facts that ch. 4 of the ground wave broadcast was deleted from the favorite channels at 12:50 on Apr. 1, 2006, and that ch. 5 in the ground wave broadcast was registered as a favorite channel at 13:00 on Apr. 1, 2006.

Here, the favorite channels mean a channel group that a user arbitrarily set from tunable channels, and the tuning of the channel that the user desires can be easily performed by performing channel tuning using the favorite channels.

The transmission control program 163b1 enables the CPU 161 to implement, for example, the function of transmitting the portable telephone number and the first personal configuration information that are stored in the first personal configuration information data table 163a1 to each of the TV broadcast receivers 3 through the communication unit 15 when the communication unit 15 receives the transmission request of the first personal configuration information transmitted from each of the TV broadcast receivers 3.

Here, a first personal configuration information transmission unit is composed of, for example, the communication unit 15 and the CPU 161 executing the transmission control program 163b1.

The first update program 163b2 enables the CPU 161 to implement, for example, the function of updating the first personal configuration information so that the set contents included in the first personal configuration information may become the set contents that the user specifies by operating the operation unit 14 when the set contents is specified.

(Configuration of TV Broadcast Receiver)

Each of the TV broadcast receivers 3 is configured to include, for example, a tuner 31 having an antenna 311, a separator 32, a sound decoder 33a, an image decoder 33b, an operation unit 34, a communication unit 35, a control unit 36 and the like, as shown in FIG. 2. Each unit is connected with one another through a bus 30.

Moreover, each of the TV broadcast receivers 3 is connected with the output apparatus 4, which is a separated body (or an integrated body), for example, through the sound decoder 33a and the image decoder 33b.

The output apparatus 4 is composed of, for example, a sound output unit 41a connected to the sound decoder 33a, an image display unit 41b connected to the image decoder 33b, and the like.

The tuner 31 having the antenna 311 receives the TV broadcast signal existing in the frequency band corresponding to the channel of the broadcast program desired by the user among the TV broadcast signals received by the antenna 311 in accordance with, for example, a control signal input from the control unit 36. Then, the tuner 31 modulates the TV broadcast signal to an intermediate frequency signal (IF signal), and outputs the IF signal to the separator 32.

Here, the antenna 311 is provided with, for example, an antenna for ground wave broadcast 311a, an antenna for satellite broadcast 311b, and the like.

The separator 32 performs the following processing in accordance with, for example, the control signals input from the control unit 36. That is, the separator 32 performs the processing of digital demodulation, error correction and the like to the IF signal output from the tuner 31 having the antenna 311, decodes a stream (for example, a transport stream), discriminates each transport packet constituting the transport stream, and separates the data pertaining to the transport packets related to the broadcast program desired by the user into compressed sound data, compressed image data and the like. Then, the separator 32 outputs the compressed sound data to the sound decoder 33a, and outputs the compressed image data to the image decoder 33b.

The sound decoder 33a decodes the compressed sound data output from the separator 32 in accordance with, for example, a control signal input from the control unit 36, and outputs sound data to the sound output unit 41a of the output apparatus 4.

The sound output unit 41a of the output apparatus 4 is provided with, for example, a not shown speaker and the like, and performs the output of sounds based on the sound data output from the sound decoder 33a.

The image decoder 33b decodes the compressed image data output from the separator 32 in accordance with, for example, a control signal input from the control unit 36, and outputs image data to the image display unit 41b of the output apparatus 4.

The image display unit 41b of the output apparatus 4 is provided with, for example, a not shown liquid crystal type display screen or the like, and performs the output of an image based on the image data output from the image decoder 33b.

The operation unit 34 is composed of, for example, operation buttons (not shown) provided on the outer surface of each of the TV broadcast receivers 3, a remote control receiver unit (not shown) capable of communicating with a remote controller (not shown) for each of the TV broadcast receivers 3, and the like. The operation unit 34 is operated by, for example, the user, and outputs various signals accompanying the operation to the control unit 36.

To put it concretely, the operation unit 34 is used, for example, when the user specifies set contents or the like.

The communication unit 35 is provided with, for example, an antenna (not shown) for performing the transmission and the reception of radio signals with the portable telephone 1, a radio frequency (RF) converter (not shown), a wireless LAN card (not shown) for connecting the communication unit 35 with a wireless LAN in accordance with the Bluetooth standard and the IEEE 802.11 standard, and the like. The communication unit 35 performs the transmission and the reception of various kinds of information with the portable telephone 1 through the network N.

To put it concretely, the communication unit 35 receives, for example, the portable telephone number and the first personal configuration information that have been transmitted by the portable telephone 1, as a first personal configuration information reception unit.

The control unit 36 is provided with, for example, a CPU 361, a RAM 362, a ROM 363 and the like.

The CPU 361 performs various control operations in accordance with various processing programs for each of the TV broadcast receivers 3 stored in the ROM 363.

The RAM 362 is provided with a program storage area for expanding the processing program executed by the CPU 361, a data storage area for storing input data and processing results produced at the time of the execution of the processing program, and the like.

The ROM 363 stores a system program executable in each of the TV broadcast receivers 3, various processing programs executable on the system program, data to be used at the time of the execution of the various processing programs, the data of the processing results of the operation processing of the CPU 361, and the like. Incidentally, the programs are stored in the ROM 363 in the form of the program codes capable of being read by a computer.

To put it concretely, the ROM 363 stores, for example, a second personal configuration information data table 363a1, a request program 363b1, an extraction program 363b2, a second update program 363b3 and the like.

The second personal configuration information data table 363a1 stores as a second storage unit, for example, second personal configuration information including set contents and the setting times when the set contents were set to each portable telephone number for identifying an individual.

Figure 4:
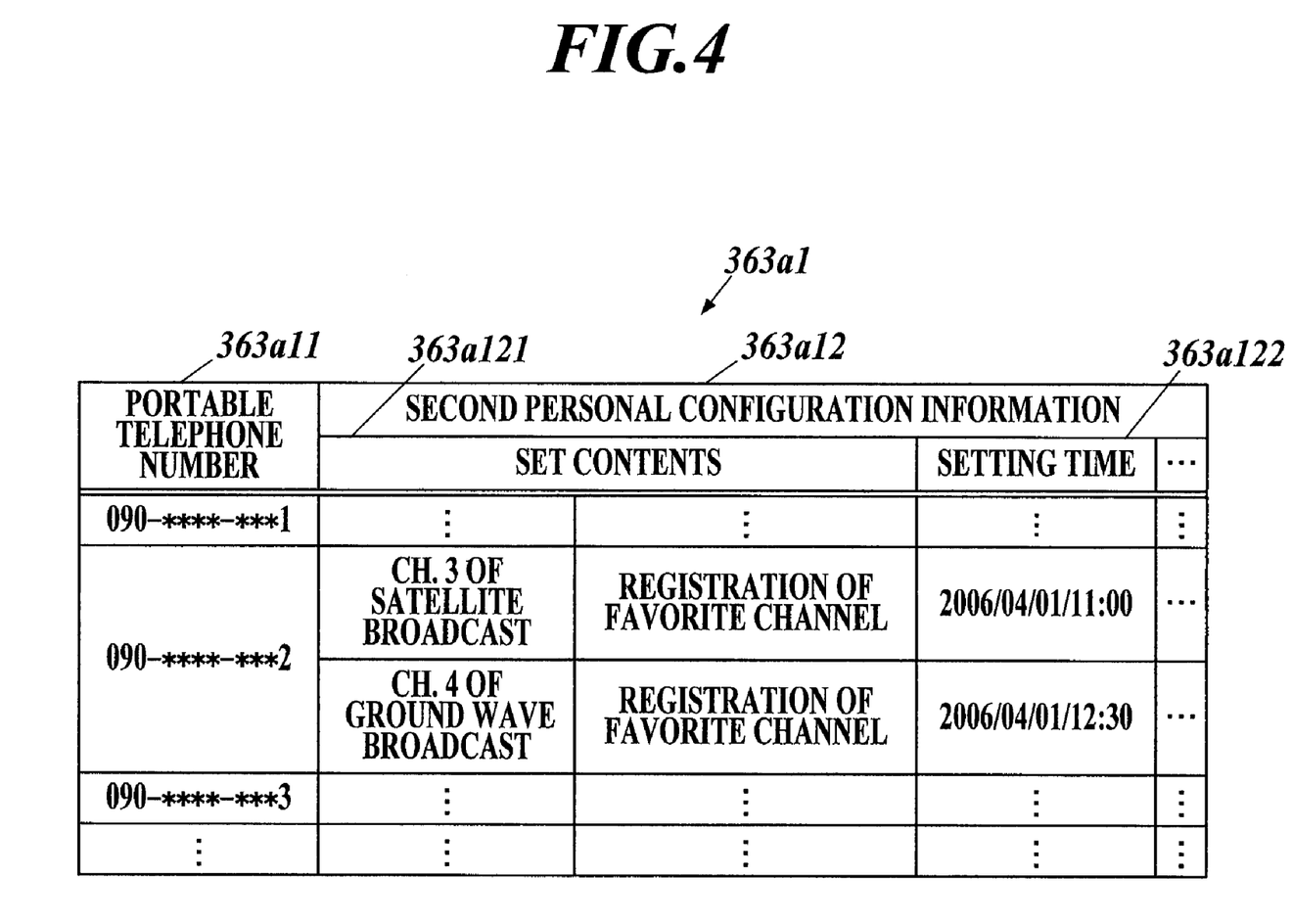
FIG. 4 is a view showing the data structure of the second personal configuration information data table shown in FIG. 2.

To put it concretely, the second personal configuration information data table 363a1 includes, for example, a "portable telephone number" storage area 363a11, a "second personal configuration information" storage area 363a12 and the like, as shown in FIG. 4.

The "portable telephone number" storage area 363a11 stores, for example, the portable telephone number of the portable telephone 1 owned by the user of the TV broadcast receivers 3.

The "second personal configuration information" storage area 363a12 includes, for example, a "set contents" storage area 363a121, a "setting time" storage area 363a122, and the like, as shown in FIG. 4.

The request program 363b1 enables the CPU 361 to implement, for example, the function of requesting the portable telephone 1 to transmit the first personal configuration information through the communication unit 35 when the power source of each of the TV broadcast receivers 3 is turned on.

Here, the request unit is composed of the communication unit 35 and the CPU 361 executing the request program 363b1.

The extraction program 363b2 enables the CPU 361 to implement, for example, the function of extracting the second personal configuration information corresponding to the portable telephone number received by the communication unit 35 from the second personal configuration information data table 363a1.

The CPU 361 functions as an extraction unit by executing such an extraction program 363b2.

The second update program 363b3 enables the CPU 361 to implement, for example, the function of updating the second personal configuration information so that the set contents included in the second personal configuration information may become the set contents that the user specifies by operating the operation unit 34 when the set contents is specified.

Moreover, the second update program 363b3 compares, for example, the setting time of the set contents in the first personal configuration information received by the communication unit 35 with the setting time of the set contents in the second personal configuration information extracted by the CPU 361 having executed the extraction program 363b2 to merge the first personal configuration information received by the communication unit 35 and the second personal configuration information extracted by the CPU 361 having executed the extraction program 363b2 so that the set contents included in the second personal configuration information may become the set contents set later (namely, the latest set contents), and thereby enables the CPU 361 to implement the function of updating the second personal configuration information.

Figure 5:
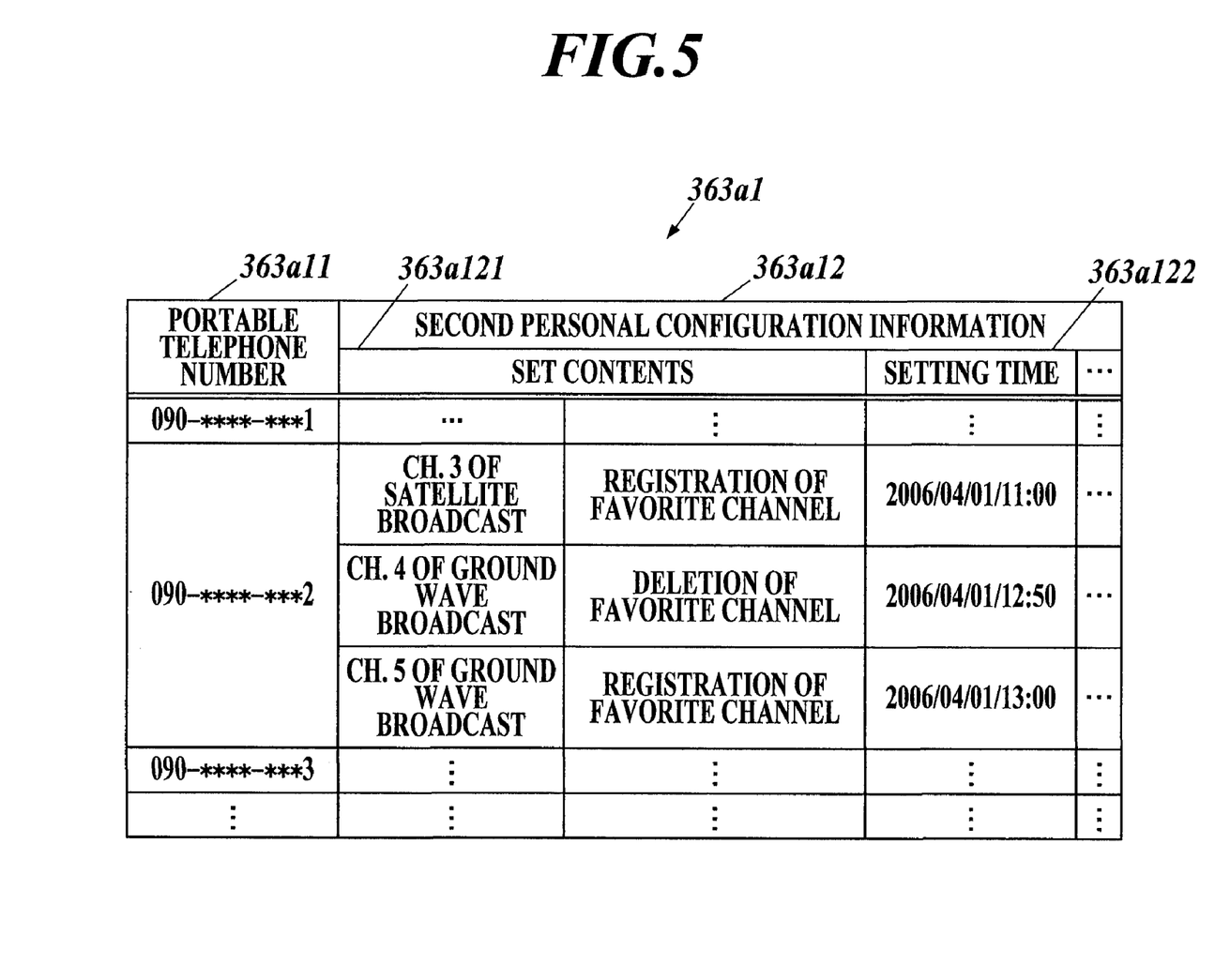
FIG. 5 is a view showing the data structure after an update of the second personal configuration information data table shown in FIG. 4.

To put it concretely, for example, when communication unit 35 receives the first personal configuration information (see FIG. 3) transmitted from the portable telephone 1 having the portable telephone number "090-**-*2" and the CPU 361 having executed the extraction program 363b2 extracts the second personal configuration information (see FIG. 4) corresponding to the portable telephone number "090-**-*2" from the second personal configuration information data table 363a1, the CPU 361 compares, for example, the setting time of the set contents in the first personal configuration information with the setting time of the set contents in the second personal configuration information. Then, for example, because the latest setting time corresponding to the set content "ch. 4 of ground wave broadcast" is the setting time "2006/04/01/12:50" in the first personal configuration information, the CPU 361 changes the set contents "ch. 4 of ground wave broadcast: registration of favorite channel" included in the second personal configuration information to the set contents "ch. 4 of ground wave broadcast: deletion of favorite channel" included in the first personal configuration information, which is the latest set contents, to update the second personal configuration information. Moreover, for example, because the set contents "ch. 5 of ground wave broadcast: registration of favorite channel" included in the first personal configuration information is not included in the second personal configuration information, the CPU 361 adds the set contents "ch. 5 of ground wave broadcast: registration of favorite channel" included in the first personal configuration information, which is the unset set content, to the set contents included in the second personal configuration information to update the second personal configuration information. Then, the CPU 361 stores the set contents into the second personal configuration information data table 363a1, for example, as shown in FIG. 5.

That is, at this stage, there are set, for example, the set content "ch. 3 of satellite broadcast: registration of favorite channel", the set content "ch. 4 of ground wave broadcast: deletion of favorite channel", and the set content "ch. 5 of ground wave broadcast: registration of favorite channel" in each of the TV broadcast receivers 3.

By executing such a second update program 363b3, the CPU 361 functions as an update unit.

<Personal Configuration Information Sharing Processing>

Figure 6:
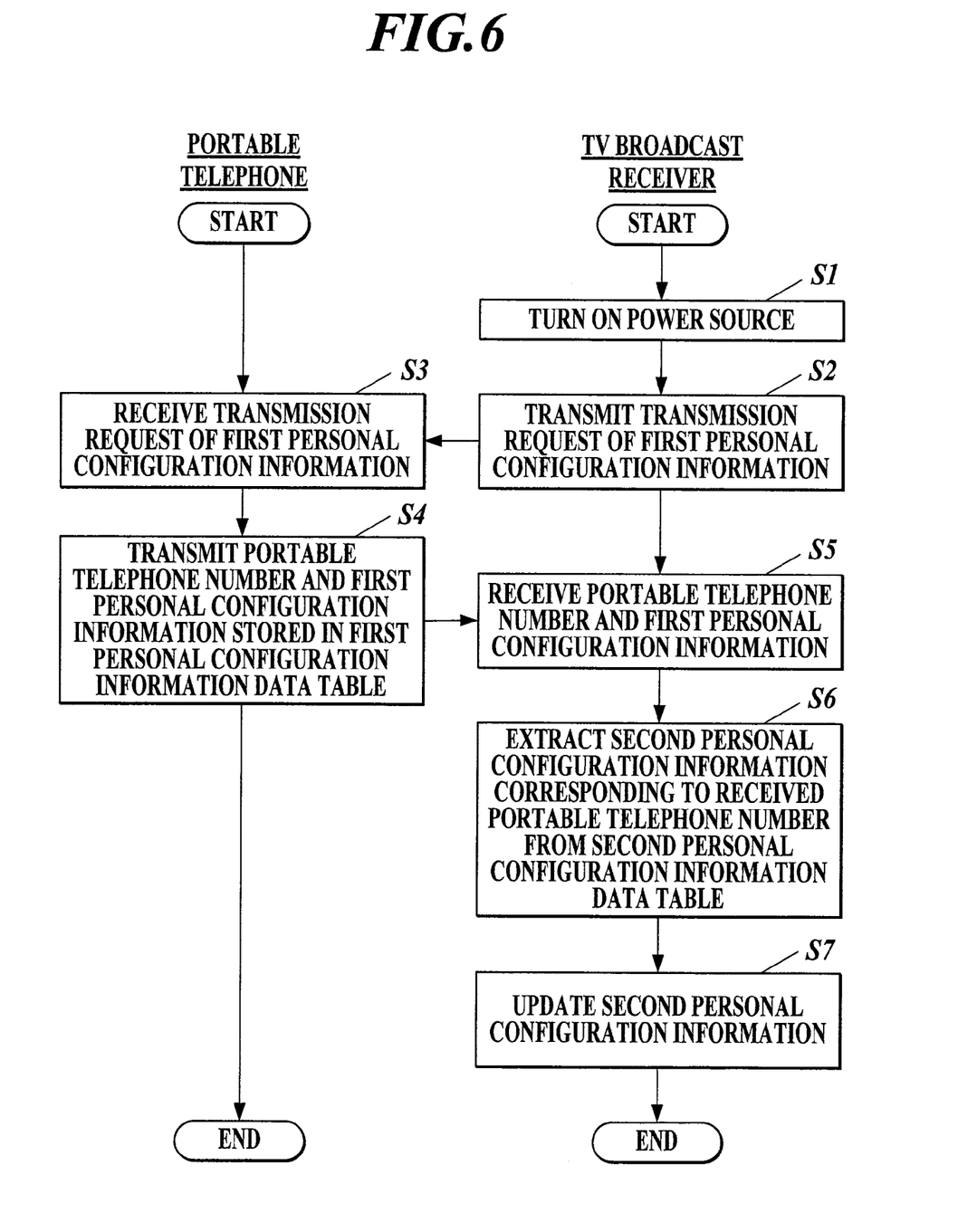
FIG. 6 is a flow chart for describing the processing related to the sharing of personal configuration information by the personal configuration information sharing system according to the present invention.

Next, the processing related to the sharing of the personal configuration information by the personal configuration information sharing system S is described with reference to the flow chart of FIG. 6.

When the power source of one of the TV broadcast receivers 3 is turned on (Step S), the CPU 361 of the TV broadcast receiver 3 executes the request program 363b1 to transmit the transmission request of the first personal configuration information to the portable telephone 1 disposed at a position capable of performing the communication with the TV broadcast receiver 3 through the communication unit 35 (Step S2).

When the communication unit 15 of the portable telephone 1 receives the transmission request of the first personal configuration information transmitted at Step S2 (Step S3), the CPU 161 of the portable telephone 1 executes, for example, the transmission control program 163b1 to transmit the portable telephone number and the first personal configuration information that are stored in the first personal configuration information data table 163a1 to the TV broadcast receiver 3 through the communication unit 15 (Step S4).

When the communication unit 35 of the TV broadcast receiver 3 receives the portable telephone number and the first personal configuration information that were transmitted at Step S4 (Step S5), the CPU 361 of the TV broadcast receiver 3 executes the extraction program 363b2 to extract the second personal configuration information corresponding to the received portable telephone number from the second personal configuration information data table 363a1 (Step S6).

Next, the CPU 361 executes the second update program 363b3. Then the CPU 361 compares the setting time of the set contents in the first personal configuration information received at Step S5 with the setting time of the set contents in the second personal configuration information extracted at Step S6, and merges the first personal configuration information and the second personal configuration information so that the set contents included in the second personal configuration information may become the set contents set later (namely, the latest set contents) to update the second personal configuration information (Step S7). Then, the CPU 361 ends the present processing.

According to the personal configuration information sharing system S of the present invention described above, the personal configuration information sharing system S is provided with the portable telephone 1 having the TV broadcast reception function and the TV broadcast receivers 3 connected to the portable telephone 1 through the network N, and is configured to share the personal configuration information by the portable telephone 1 and the TV broadcast receivers 3. The portable telephone 1 can store the portable telephone number for identifying an individual, and the first personal configuration information including the set contents related to the setting of channels and the setting times when the set contents were set with the first personal configuration information data table 163a1, and can receive a transmission request of the first personal configuration information from each of the TV broadcast receivers 3 with the communication unit 15. The portable telephone 1 can transmit the portable telephone number and the first personal configuration information that are stored in the first personal configuration information data table 163a1 to the TV broadcast receivers 3 with the communication unit 15 and the CPU 161 having executed the transmission control program 163b1 when the communication unit 15 receives the transmission request of the first personal configuration information. Each of the TV broadcast receivers 3 can store the second personal configuration information including the set contents and the setting time when the set contents were set with the second personal configuration information data table 363a1 to each portable telephone number for identifying an individual, and can request the portable telephone 1 to transmit the first personal configuration information with the communication unit 35 and the CPU 361 having executed request program 363b1 when the power source of each of the TV broadcast receivers 3 is turned on. Each of the TV broadcast receivers 3 can receive the portable telephone number and the first personal configuration information that are transmitted by the portable telephone 1 (with the communication unit 15 and the CPU 161 having executed the transmission control program 163b1) with the communication unit 35, and can extract the second personal configuration information corresponding to the portable telephone number received by the communication unit 35 from the second personal configuration information data table 363a1 with the CPU 361 executing the extraction program 363b2. Each of the TV broadcast receivers 3 can compare the setting time of the set contents in the first personal configuration information received by the communication unit 35 with the setting time of the set contents in the second personal configuration information extracted by the CPU 361 having executed the extraction program 363b2, and merge the first personal configuration information and the second personal configuration information so that the set contents included in the second personal configuration information may become the set contents set later (namely, the latest set contents) to update the second personal configuration information by the CPU 361 executing the second update program 363b3.

That is, when the power source of one of the TV broadcast receivers 3 is turned on, the TV broadcast receiver 3 can automatically set the latest personal configuration information based on the first personal configuration information transmitted from the portable telephone 1 and the second personal configuration information set in the TV broadcast receiver 3. Consequently, the setting of the latest personal configuration information can be simplified.

Moreover, for example, when the power source of the TV broadcast receiver 3 is unexpectedly turned off and thereafter recovers to be turned on, the latest personal configuration information is automatically set in each of the TV broadcast receivers 3. Consequently, the convenience of the personal configuration information sharing system is high.

Moreover, because the set contents included in the first personal configuration information and the second personal configuration information include the contents related to the setting of a channel, the contents related to the setting of the channel can be supplied to both the portable telephone 1 and the TV broadcast receivers 3, and the usability of the personal configuration information sharing system is good.

Incidentally, the present invention is not limited to the embodiment described above, but the present invention can be suitably changed without departing from the subject matter thereof.

The electric equipment may be any equipment such as various image recording apparatus (for example, a DVD recorder, a HDD recorder and a VCR), a personal computer and the like besides the portable telephone and the TV broadcast receiver as long as the equipment can be connected to a network.

Although the personal configuration information sharing system is configured so that each of the TV broadcast receivers 3 requests the portable telephone 1 to transmit the first personal configuration information for updating the second personal configuration information, the system may be configured so that, for example, the portable telephone 1 requests each of the TV broadcast receivers 3 to transmit the second personal configuration information for updating the first personal configuration information.

The personal configuration information is not shared only between the portable telephone 1 and each of the TV broadcast receivers 3, but the personal configuration information may also be shared between, for example, the TV broadcast receivers 3 installed in the house h to be connected with one another through the network N.

The set contents related to the setting of the channels included in the first personal configuration information and the second personal configuration information are not only related to the registration and the deletion of a favorite channel, but the set contents may be also related to, for example, the registration and the deletion of record reservation setting, and the like.

The set contents included in the first personal configuration information and the second personal configuration information are not only the contents related to the setting of a channel, but the set contents may be also the contents related to, for example, the kind of the antenna performing automatic scanning, the time of the automatic scanning, a deleted recorded program, the time of the deletion and the like. That is, the set contents are arbitrarily set.

Each of the TV broadcast receivers 3 does not request the transmission of the first personal configuration information only at the time of turning on the power source, but each of the TV broadcast receivers 3 may also request, for example, at the time when a user instructs the request with the operation of the operation unit 34.

The entire disclosure of Japanese Patent Application No. 2006-111014 filed on Apr. 13, 2006, including description, claims, drawings and summary are incorporated herein by reference.

What is claimed is:

1. A personal configuration information sharing system comprising a plurality of portable telephones each having a television broadcast reception function, and a television broadcast receiver connected to the portable telephones through a network, the portable telephones and the television broadcast receiver sharing personal configuration information with each other, wherein
   each of the portable telephones includes:
   a tuner to receive a television broadcast signal existing in a frequency band corresponding to a channel of a broadcast program desired by a user;
   a first storage unit to store personal identification information for identifying an individual, and first personal configuration information including set contents related to setting of the channel and a setting time when the set contents have been set;
   a transmission request reception unit to receive a transmission request of the first personal configuration information from the television broadcast receiver; and
   a first personal configuration information transmission unit to transmit the personal identification information and the first personal configuration information, both of which are stored in the first storage unit, to the television broadcast receiver when the reception unit receives the transmission request of the first personal configuration information, and wherein
   the television broadcast receiver includes:
   a tuner to receive the television broadcast signal existing in the frequency band corresponding to the channel of the broadcast program desired by the user;
   a second storage unit to store second personal configuration information including set contents related to setting of the channel and a setting time when the set contents have been set associated with each personal identification information for identifying an individual;
   a request unit to request each of the portable telephones to transmit the respective first personal configuration information when a power source of the television broadcast receiver is turned on;
   a first personal configuration information reception unit to receive the respective personal identification information and the respective first personal configuration information, both of which are transmitted from the respective first personal configuration information transmission unit;
   an extraction unit to extract the second personal configuration information corresponding to the respective personal identification information received by the first personal configuration information reception unit from the second storage unit; and
   an update unit to compare the setting time of the set contents in each respective first personal configuration information received by the first personal configuration information reception unit with the setting time of the respective set contents in the second personal configuration information extracted by the extraction unit, and to merge each respective first personal configuration information received by the first personal configuration information reception unit and the second personal configuration information extracted by the extraction unit, so that the second personal configuration information is updated to be the set contents which are set later for each respective personal identification information.

2. A personal configuration information sharing system comprising a plurality of pieces of first electric equipment and a piece of second electric equipment connected with one another through a network, the plurality of pieces of first electric equipment and the piece of second electric equipment sharing personal configuration information with each other, wherein each of the pieces of first electric equipment includes:
   a tuner to receive a television broadcast signal existing in a frequency band corresponding to a channel of a broadcast program desired by a user;
   a first storage unit storing first personal configuration information including set contents related to setting of the channel and a setting time when the set contents have been set associated with each personal identification information for identifying an individual;
   a transmission request reception unit to receive a transmission request of the first personal configuration information from second electric equipment; and
   a first personal configuration information transmission unit to transmit the personal identification information and the first personal configuration information, both of which are stored in the first storage unit, to the second electric equipment when the reception unit receives the transmission request of the first personal configuration information, and wherein the piece of second electric equipment includes:
- a tuner to receive the television broadcast signal existing in the frequency band corresponding to the channel of the broadcast program desired by the user;
- a second storage unit to store second personal configuration information including set contents related to setting of the channel and a setting time when the set contents have been set associated with each personal identification information for identifying an individual;
- a request unit to request each of the pieces of first electric equipment to transmit the respective first personal configuration information;
- a first personal configuration information reception unit to receive the respective personal identification information and the respective first personal configuration information, both of which are transmitted from the respective first personal configuration information transmission unit;
- an extraction unit to extract the second personal configuration information corresponding to the respective personal identification information received by the first personal configuration information reception unit from the second storage unit; and
- an update unit to compare the setting time of the set contents in the each respective first personal configuration information received by the first personal configuration information reception unit with the setting time of the set contents in the second personal configuration information extracted by the extraction unit, and to merge each respective first personal configuration information received by the first personal configuration information reception unit and the second personal configuration information extracted by the extraction unit so that the second personal configuration information is updated to be the set contents which are set later, for each respective personal identification information.

3. The personal configuration information sharing system according to claim 2, wherein
the request unit requests each of the pieces of first electric equipment to transmit the respective first personal configuration information when a power source of the piece of second electric equipment is turned on.

* * * * *